United States Patent
Gilbert

(10) Patent No.: US 7,246,550 B2
(45) Date of Patent: Jul. 24, 2007

(54) PRESSURE DIFFERENTIAL-DRIVEN ENGINE

(76) Inventor: William Gilbert, 4344 W. Cheyenne Ave., North Las Vegas, NV (US) 89032

( * ) Notice: Subject to any disclaimer, the term of this patent is extended or adjusted under 35 U.S.C. 154(b) by 0 days.

(21) Appl. No.: 10/552,091

(22) PCT Filed: Apr. 4, 2004

(86) PCT No.: PCT/US2004/010375
§ 371 (c)(1),
(2), (4) Date: Sep. 11, 2006

(87) PCT Pub. No.: WO2004/090329
PCT Pub. Date: Oct. 21, 2004

(65) Prior Publication Data
US 2007/0000379 A1    Jan. 4, 2007

(51) Int. Cl.
*F01B 15/00* (2006.01)
*F01B 15/06* (2006.01)
(52) U.S. Cl. .................... 92/117 R; 91/50
(58) Field of Classification Search ........... 92/117 R, 92/117 A; 91/50; 74/25, 126, 128
See application file for complete search history.

(56) References Cited

U.S. PATENT DOCUMENTS

| | | | |
|---|---|---|---|
| 4,121,679 A | 10/1978 | March | |
| 4,457,678 A | 7/1984 | Kinder et al. | |
| 5,012,643 A | 5/1991 | Higami | |
| 5,096,009 A * | 3/1992 | Hirmann | 74/126 |
| 6,336,389 B1 | 1/2002 | English et al. | |

* cited by examiner

*Primary Examiner*—Thomas E. Lazo
(74) *Attorney, Agent, or Firm*—Thorpe North & Western LLP

(57) ABSTRACT

A pressure differential-driven engine (10) includes an outer pressurizable enclosure (12). A pressure barrier plate (14) is disposed within the outer pressurizable enclosure and an actuator enclosure (16) is disposed adjacent the pressure barrier plate and has an actuator (17) disposed therein. The actuator has a high pressure exposure surface (30) forming an oblique angle with respect to the pressure barrier plate. The pressure barrier plate, a bottom of the actuator, and the actuator enclosure cooperatively define a pressurizable cavity (34) cyclable between a first, high pressure state, and a second, low pressure state. The actuator and actuator enclosure are collectively slidable relative to the barrier plate in reaction to cycling of the pressurizable cavity between the first and second pressure states to produce usable translational energy.

32 Claims, 11 Drawing Sheets

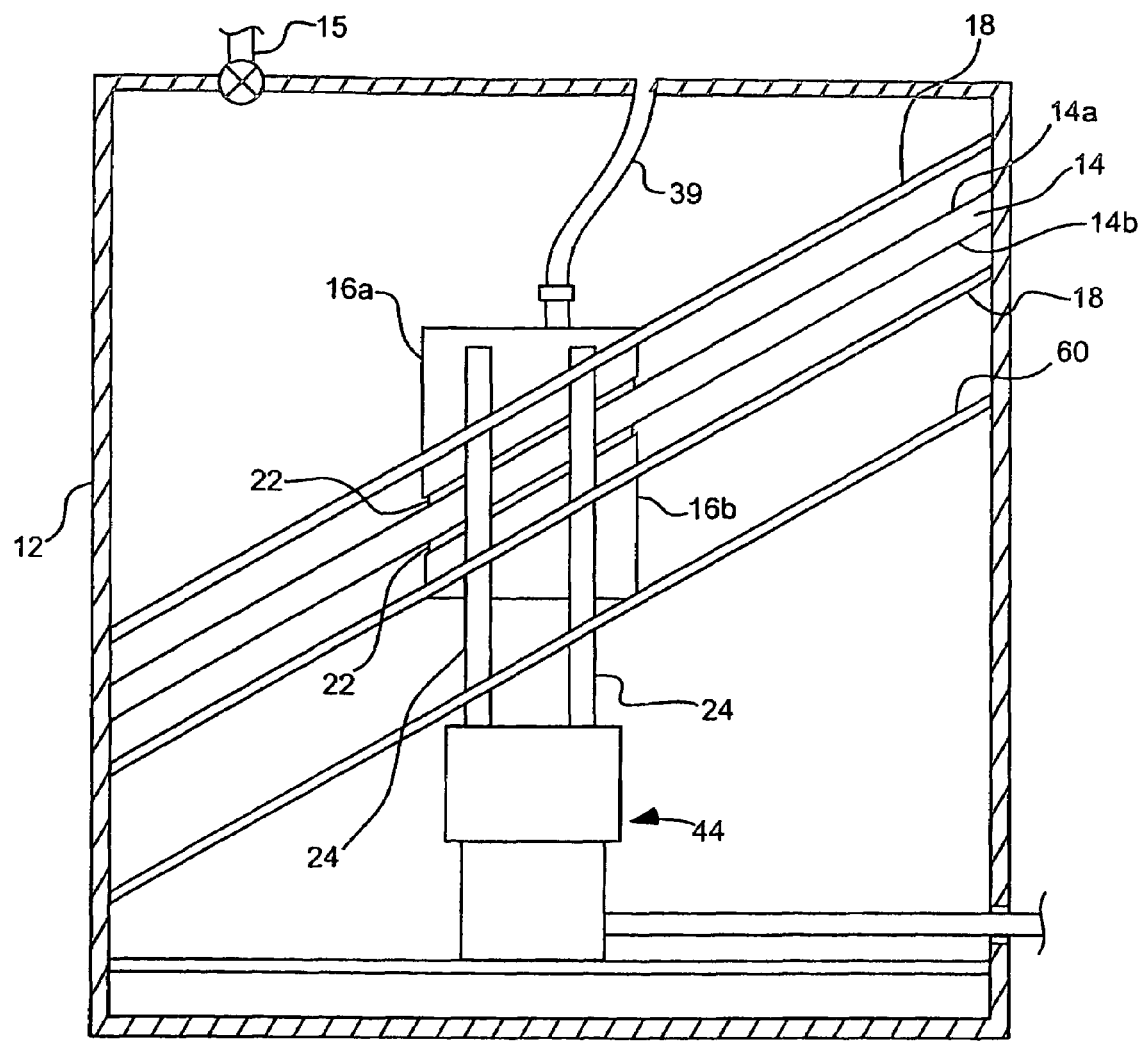

PRESSURE DIFFERENTIAL-DRIVEN ENGINE

BACKGROUND OF THE INVENTION

1. Field of the Invention

The present invention relates generally to pressure differential-driven engines. More specifically, the invention relates to an engine using a pressurized working fluid to produce cyclic motion.

2. Related Art

Engines for converting energy from one form to another have been used for many years in a number of applications. Perhaps the best known example, the internal combustion ("IC") engine, converts energy stored in the form of petroleum-based fuel into mechanical energy. IC engines have been successfully utilized to power vehicles, electric generators, lawn mowers, etc. Typical IC engines convert energy stored in fuel into mechanical energy by burning or detonating the fuel and extracting force generated in a cylinder/piston assembly. Typical IC engines use the force generated in the cylinder/piston assembly to drive some type of output device, such as a rotary crankshaft, a direct rotary output, or other power take-off device.

While IC engines have been used with success in a variety of applications, they can be problematic for a number of reasons. One such problem relates to the efficiency of the energy conversion process. For instance, typical IC engines have efficiency ratings in the range of 30–50%, with 50% considered to be highly efficient and generally only achievable by large, highly precise, and, therefore, costly engines. In addition, the process of converting fossil fuels into useful mechanical energy often results in large degrees of pollution released into the atmosphere, which can be detrimental to the environment in general, and particularly to humans who are exposed to or breathe the polluted air. As more and more IC-powered vehicles are produced and operated by an increasingly greater population, the levels of pollution produced by IC-powered vehicles is becoming an increasingly greater concern. In addition, IC engines necessarily create a great deal of heat, as they produce a series of combustion events which generate force and associated byproduct of heat. This can be problematic for applications which benefit from low-heat production engines.

In addition to IC engines, a variety of energy transducers have been developed for converting energy from one form to another. Examples of such transducers include heat engines, fluid compressors, hydraulic actuators, etc.

SUMMARY OF THE INVENTION

It has been recognized that it would be advantageous to develop an engine that produces usable mechanical energy with increased efficiency. In addition, it has been recognized that it would be advantageous to develop a mechanical engine that produces useable mechanical energy while minimizing the byproducts of pollution, high heat generation, and dangerous combustion byproducts.

The invention provides a pressure differential-driven engine, including an outer pressurizable enclosure. A pressure barrier plate can be disposed within the outer pressurizable enclosure and an actuator enclosure can be disposed adjacent the pressure barrier plate and can have an actuator disposed therein. The actuator can have a high pressure exposure surface forming an oblique angle with respect to the pressure barrier plate. The pressure barrier plate, a bottom of the actuator, and the actuator enclosure can cooperatively define a pressurizable cavity which is cyclable between a first, high pressure state, and a second, low pressure state. The actuator and actuator enclosure can be collectively slidable relative to the barrier plate in reaction to cycling of the pressurizable cavity between the first and second pressure states to produce usable translational energy.

In accordance with another aspect of the present invention, a pressure differential-driven engine is provided, including an outer pressurizable enclosure and a pressure barrier plate disposed within the outer pressurizable enclosure. An actuator enclosure can be disposed upon the pressure barrier plate and can have an actuator disposed therein. The actuator can be rigidly and slidably coupled to at least one support rail fixed in position with respect to the actuator enclosure. The pressure barrier plate, a bottom of the actuator, and the actuator enclosure can cooperatively define a pressurizable cavity cyclable between a first, high pressure state, and a second, low pressure state. The actuator and actuator enclosure can be slidable relative to the barrier plate in reaction to cycling of the pressurizable cavity between the first and second pressure states to produce usable translational energy.

In accordance with another aspect of the present invention, a method for converting energy from a high pressure fluid into usable translational energy is provided, including the steps of: disposing an actuator enclosure adjacent a pressure barrier plate within an outer, high pressure enclosure, said actuator enclosure being slidable relative to the barrier plate within the outer, high pressure enclosure; disposing an actuator within the actuator enclosure, with a high pressure exposure surface of the actuator disposed at an oblique angle to the pressure barrier plate; retaining the actuator from moving with respect to the actuator enclosure; pressurizing the outer, high pressure enclosure to a high pressure state; and creating a low pressure state between the actuator and the actuator enclosure to thereby cause the actuator and actuator enclosure to slide relative to the barrier plate within the outer, high pressure enclosure.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1 is a front, partially sectioned view of a pressure differential-driven engine in accordance with an embodiment of the present invention;

DETAILED DESCRIPTION

Figure 2:
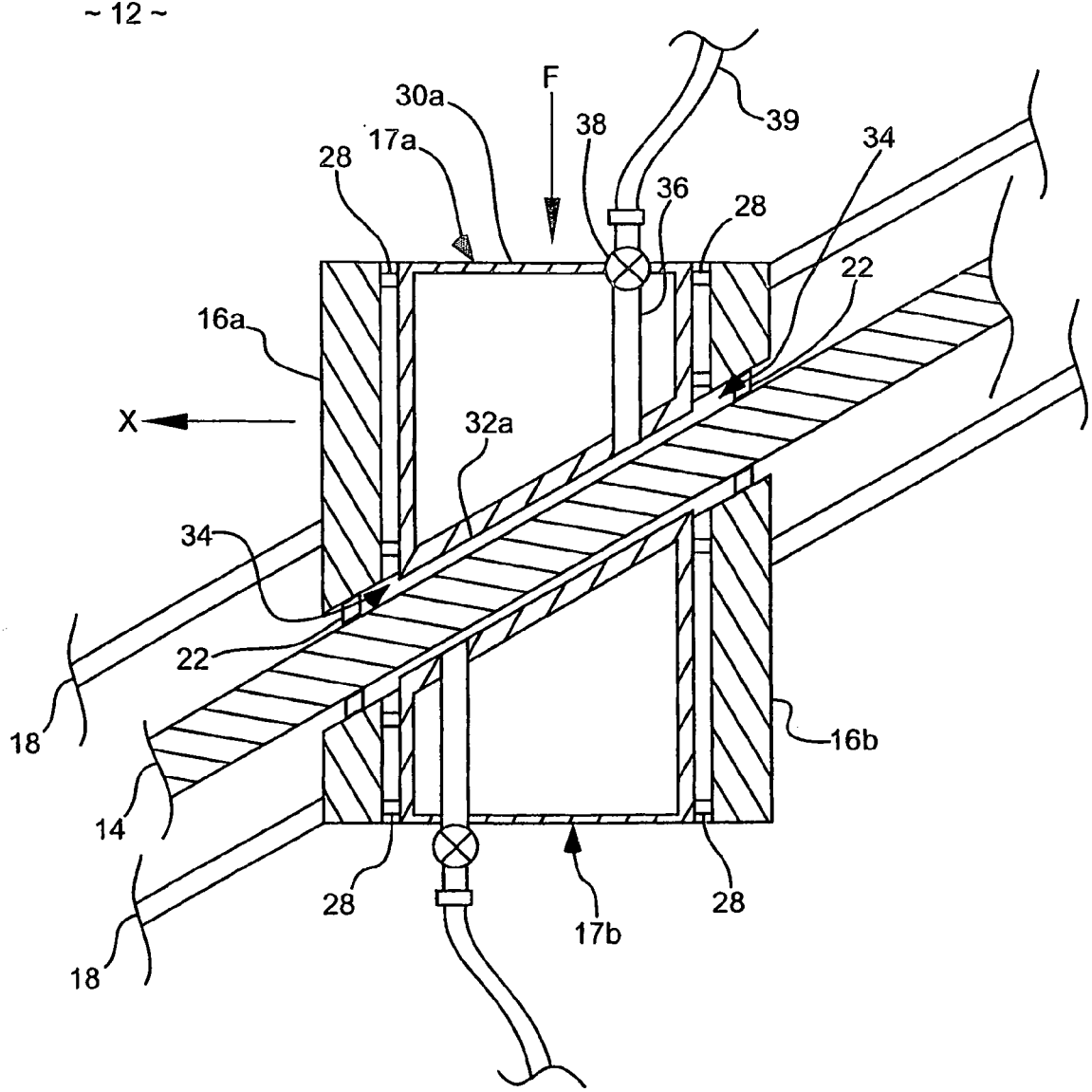
FIG. 2 is a front, sectional view of one aspect of the engine of FIG. 1.

Reference will now be made to the exemplary embodiments illustrated in the drawings, which are illustrative of the underlying scientific principles thereof; and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1, a system, indicated generally at 10, in accordance with the present invention is shown for a pressure differential-driven engine. The system includes an outer, pressurizable enclosure or vessel 12, which can be configured to be pressurized with a fluid, such as pressurized air, or other gas or liquid. Disposed in the vessel 12 is a pressure barrier plate 14 which, in the embodiment shown, is configured to be stationary relative to the pressure vessel and can be slanted at an angle relative to a lower surface of the pressurizable enclosure or vessel 12. The pressure barrier plate 14 can include a highly polished or finished upper and lower surface 14a and 14b, respectively.

Disposed adjacent the barrier plate 14 is at least one actuator enclosure 16 which can enclose an actuator (not visible in FIG. 1 but discussed in further detail below). One or more guide or support rails 18 can be disposed adjacent and parallel to the barrier plate. As discussed in more detail below, the actuators enclosed by enclosures 16 can be slidably coupled to the guide rails to constrain the actuator to sliding in a slanted (with respect to the bottom of the enclosure) path along the guide rails 18. Actuator enclosure seals 22 can be disposed between the actuator enclosures 16 and the barrier plate 14 to facilitate low-friction sliding by the enclosures over the barrier plate; and to allow a substantially pressure-tight cavity to be created within the enclosure. Connecting rods 24 can be utilized to connect the actuator enclosures 16 with a lower, collapsible piston assembly 44, as discussed in more detail below. In addition, the connecting rods 24 can provide vertical alignment and stability to the actuator enclosures 16 and can be coupled to and connect with guide or support rails 18, as discussed in more detail below.

In use, the pressurizable enclosure or vessel 12 is pressurized with a fluid such as pressurized air, so that the various components enclosed within the vessel are substantially all exposed to a first, higher pressure. In the embodiment shown in FIG. 1, a valve 15 can disposed between a high pressure source (not shown) and the vessel to facilitate pressurization of the vessel. By means that are discussed in more detail below, a pressure differential is created within the actuator enclosure which causes the actuator and actuator enclosure 16a to slide angledly up or down the barrier plate. In one embodiment, a lower pressure is established in a pressurizable cavity formed between the actuator, the barrier plate, and the actuator enclosure, which causes a pressure differential condition on the actuator and causes the actuator to move.

Thus, as the actuator and actuator enclosure 16a move upwardly and downwardly along the barrier plate, cyclic motion is produced which includes both a vertical and a horizontal component. As discussed in more detail below, in one embodiment this motion is translated into cyclic horizontal motion, which can be translated to a power take-off device and used to perform mechanical work.

As shown in FIG. 1, both an upper enclosure 16a and a lower enclosure 16b can be provided. Thus, while multiple actuators and actuator enclosures are not necessary, by including one actuator and actuator enclosure on the top of the barrier plate and one on the bottom of the barrier plate, cyclic motion between upward and downward slanted motion can be achieved by alternately creating a pressure differential condition on the upper and lower actuators. Thus, a pressure differential in the top actuator enclosure 16a will cause downward slanted motion and a pressure differential in the bottom actuator enclosure 16b will cause upward slanted motion. By alternately energizing the two actuators, rapid cyclic motion up and down the barrier plate 14 and guide rails 18 can be effectuated.

While the discussion herein will primarily focus on a lower and a higher pressure condition used to create the desired pressure differential, it is to be understood that more than two pressure conditions can be utilized, including variable high or low pressure conditions. However, to simplify the discussion herein, reference will be made to a high pressure, which can be above atmospheric pressure, and a low pressure, lower than the high pressure, which can include, but is not limited to, atmospheric pressure. By establishing the low pressure as atmospheric pressure, only one pressure source, a high pressure source, need be utilized, as the low pressure simply exists in the atmosphere surrounding the vessel 12.

Shown in greater, sectional detail in FIG. 2, the system can include an upper actuator 17a and a lower actuator 17b, each of which can be disposed or enclosed within actuator enclosures 16a and 16b, respectively. While actuators and actuator enclosures of any type can be utilized in the present invention, in one embodiment the actuators include a piston-like configuration and are disposed within cylinders, similar to pistons and cylinders which might be included in an internal combustion engine. While not so limited, in the interest of simplicity the following discussion will refer to the actuators as pistons and the actuator enclosures as cylinders. It is to be understood, however, that the invention is not so limited and that other devices can be used for either the actuators or actuator enclosures, as is known in the art. The embodiment of the pistons 17 shown in FIG. 2 includes pistons having a hollow interior portion, which may be utilized to reduce overall weight and material requirements. However, a solid piston can also be utilized, as can a combination of the two.

To further simplify the discussion herein, reference will be primarily made to the piston 17a and cylinder 16a disposed on top of the barrier plate 14. It is to be understood that no limitation of the invention is thereby intended, as multiple pistons can be utilized in the present invention, and can be disposed on top or bottom of the barrier plate, as shown in the various figures.

As shown in FIG. 2, piston seals 28 can be disposed between piston 17a and its respective cylinder 16a. The piston seals serve to limit all or part of the sides of the piston 17a from being exposed to a high pressure condition. In this manner, only a top, high pressure exposure surface 30a of the piston is substantially continually exposed to the high pressure condition present within the vessel 12. As indicated in FIG. 2, a pressurizable cavity or pressure exchange compartment 34 is formed or defined by a bottom 32a of the piston 17a, the barrier plate 14, the actuator enclosure seals 22, and lowermost piston seals 28. The pressurizable cavity 34 is utilized to alternately expose the bottom 32a of the piston 17a to the high and the low pressure condition to create an alternating pressure differential condition on the piston. The pressurizable cavity is thus cyclable between a first, higher pressure state and a second, lower pressure state.

It will be appreciated that, while movement of the pistons is facilitated by creating a low pressure condition between the barrier plate and piston, when a high pressure condition is present between the two, a more or less "neutral" pressure condition is imposed on the piston. Thus, when high pressure is acting on both the bottom and top of the piston, the pressure forces on the piston are substantially neutralized, and the piston is not disposed to move. When an upper and a lower piston are utilized, a neutral pressure differential on one piston will not significantly impede motion undergone by the other piston. In one embodiment, a neutral pressure differential and a positive pressure differential will alternately be applied to an upper and a lower piston, to alternately move both pistons upwardly and downwardly on the barrier plate between the guide rails.

It will also be appreciated that, as the low pressure condition created in the pressurizable cavity results in movement of the pistons, creating a pressure differential between the top and bottom of a piston can be done with relatively little fluid exchange. That is, the pressurizable cavity can be made substantially small in volume, as only a small pocket of low pressure fluid may be required to create an effective pressure differential. Thus, the present invention can be used to provide cyclic movement of the piston/cylinder assembly with relatively low fluid exchange volumes.

As discussed in more detail below, particularly in relation to FIG. 3, the piston 17a can be limited or constrained from absolute vertical movement by guide rails 18. While the guide rails prevent or limit absolute vertical movement, the piston 17a is free to slide along the guide rails in a trajectory substantially parallel to the barrier plate 14. Thus, as the pressurizable cavity 34 is exposed to the low pressure condition, a force differential results upon the piston 17a, as the top is exposed to the high pressure force F while the bottom is exposed to the low pressure. This force, which tends to move the piston downwardly, is transferred to the guide rails 18 and the piston moves down the guide rails, which are slanted at approximately the same angle as the barrier plate 14, with a horizontal component of movement X. Thus, in the embodiment shown, the guide or support rails are substantially parallel to the pressure barrier plate.

The low pressure condition created in the pressurizable cavity 34 can be achieved in a variety of manners utilizing a variety of devices. In one embodiment, as shown in FIG. 2, a channel 36 or other opening can be formed in the piston. The channel can be operatively coupled to a valve 38 which in turn can be coupled to a hose 39 which is open to the low pressure (as shown in FIG. 1). Thus, when a low pressure condition is desired, the valve 38 can be opened, at which point the high pressure fluid previously contained in the cavity will be vented to low pressure, and a low pressure condition will result in the cavity which causes a pressure differential resulting on the piston. The pressure differential resulting on the piston will then cause the piston to move down the guide rail.

The hose 39 can be any type known to those skilled in the art, and in one embodiment includes a relatively flexible material that allows the hose to easily bend and move to enable the hose to follow the movement of the piston and cylinder. Similarly, a variety of means or methods known to those skilled in the art can also be used to create a low pressure condition in the pressurizable cavity 34. For example, it is contemplated that the pressure barrier plate 14 can include a channel or other opening which can introduce the low pressure condition into the cavity. Other suitable valving and control devices (not shown) can also be included to control the pressure condition within the pressurizable cavities of the piston/cylinder assemblies. As the pressure differential-driven engine may be operated at high speed cycles, a computer-controlled valving system (not shown) may be utilized to facilitate accurate and timely control of the pressure differential. In addition, it is contemplate that a valving or switching system (not shown) can be associated with each of the pistons to facilitate exchange of low pressure and high pressure air between the pressurizable cavities. In this manner, introduction of external air or fluid into the vessel 12 can be reduced or eliminated, and the system can re-use high pressure and low pressure fluid.

Figure 3:
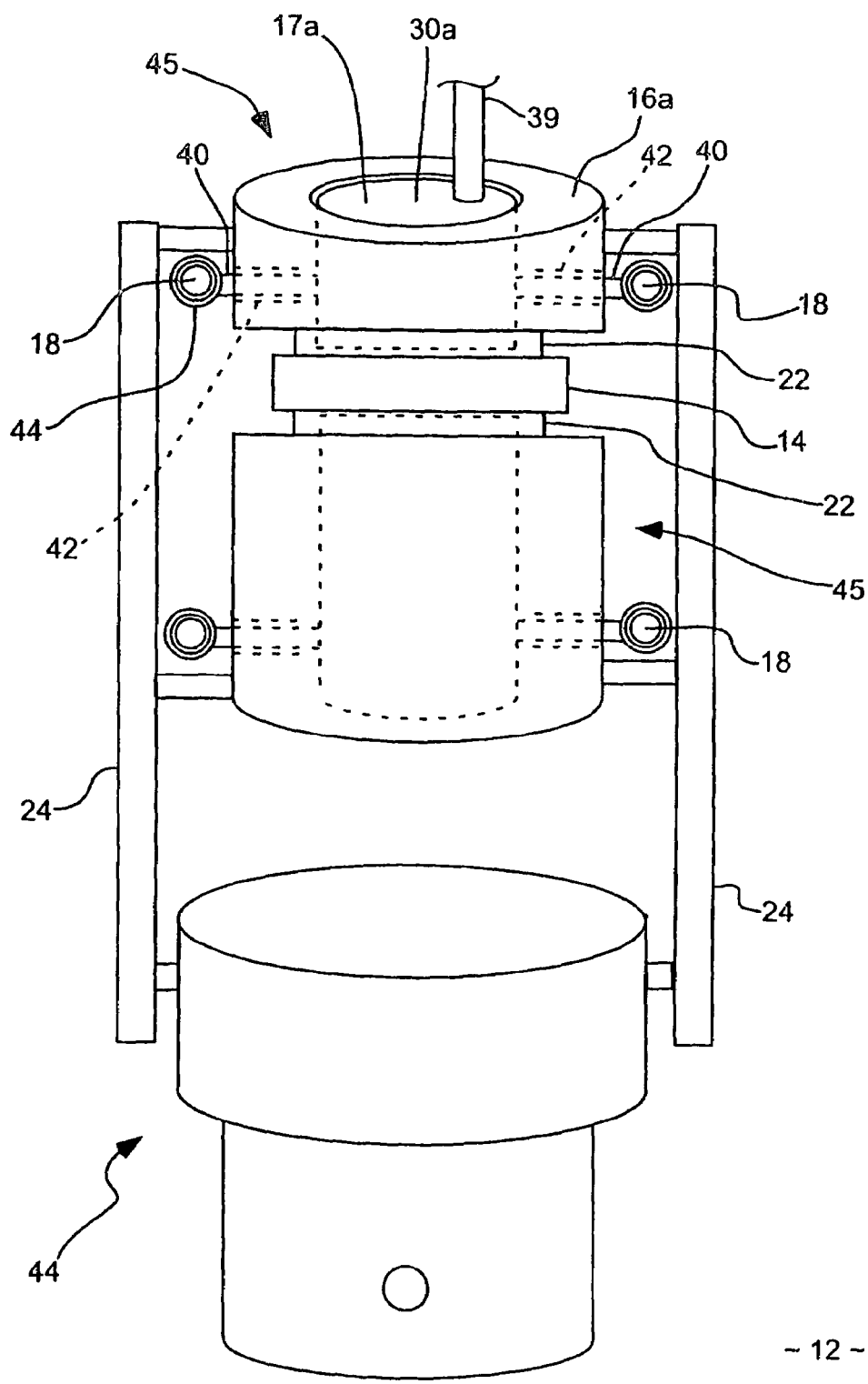
FIG. 3 is rear view of one aspect of the engine of FIG. 1, oriented along a plane orthogonal to the generally parallel barrier plate and guide rails of the engine of FIG. 1.

FIG. 3 illustrates one aspect of the present invention as viewed along a plane parallel to the barrier plate 14 and the guide rails 18. Thus, the barrier plate 14 and guide rails 18 extend into a plane orthogonal to the page on which FIG. 3 is disposed. Shown in FIG. 3 are connecting pins 40 which can be coupled to the piston 17a and extend outwardly through channels 42 formed in the cylinder 16a. The channels 42 can be sized slightly larger than the pins 40, to allow some movement of the piston without interfering contact with the cylinder 16a. The pins 40 can be coupled to the guide rails 18 in any manner known to those skilled in the art, and are shown in FIG. 3 as terminating in annular bearings 44. Of course, any suitable bearing or other connecting means can also be used.

It will be appreciated that, upon being subject to a pressure differential condition, that is, a condition in which the bottom 32 of the piston 17a is exposed to the lower pressure state in the pressurizable cavity (not visible in FIG. 3), the piston will apply a downward force in reaction to the pressure force on the top of the piston. This force, which is transferred to slanted guide rails 18, results in a force component along the longitudinal axis of the guide rails, which in turn results in the piston sliding downwardly between the guide rails. Because the cylinder 16a is disposed around the piston 17a, movement of the piston results in movement of the cylinder. Movement of the cylinder results in downward motion and force applied by the connecting rods 24 to a lower, collapsible piston assembly 44, as discussed in more detail below.

Effectuation of cyclic movement of the pistons in accordance with the embodiments discussed above provides an upper piston assembly 45 that varies between upward and downward movement along or between the slanted guide rails 18. In order to utilize this cyclic movement, a power take-off device can be operatively coupled to the upper piston assembly. As shown in the various figures, and in more detail in FIG. 4, in one embodiment of the invention, the power take-off includes a lower, collapsible piston assembly 44. The collapsible piston assembly can include an upper piston 46 disposed over or within a lower piston 48. Seals 50 can be disposed between the upper 46 and lower 48 pistons to limit high pressure fluid from entering the piston assembly. Low pressure shaft 52 can be in fluid communication with the piston assembly 44 to provide a substantially constant low pressure condition within the piston assembly. The low pressure shaft can be vented to an outer, atmospheric pressure state outside of the vessel 12. One or more outer seals 54 can be disposed in the wall of the vessel to enable lateral travel of the low pressure shaft as the piston assembly moves laterally in the opening in the vessel wall. Linear guide rail 56 can be disposed adjacent the lower piston assembly 44 to provide support for the assembly, and can be coupled to the lower piston assembly through low friction couplings such as bearing assemblies (not shown).

Figure 4:
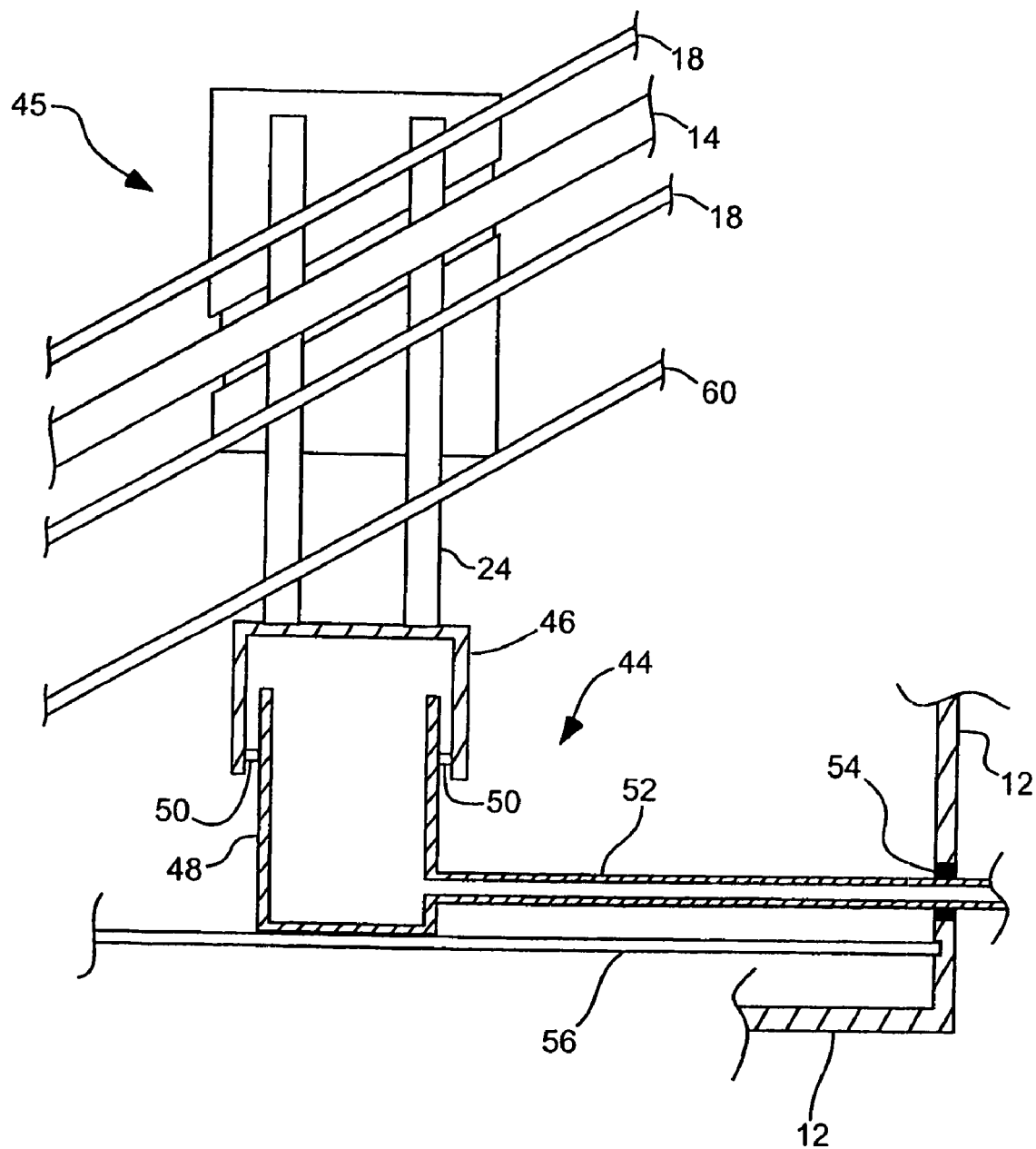
FIG. 4 is a more detailed view of one aspect of a lower, collapsible piston of the engine of FIG. 1.

As will be appreciated from viewing FIG. 4, as the upper piston assembly moves along the barrier plate 14 and guide rails 18, the connecting rods 24 apply an upward or downward force, respectively, to the top piston 46 of lower piston assembly 44. Thus, the collapsible piston assembly 44 either collapses or expands, depending on the slanted, lateral movement of the upper piston assembly. Correspondingly, the lateral component of movement of piston assembly 44 causes the low pressure shaft 52 to move laterally side-to-side. As the low pressure shaft 52 provides a substantially constant low pressure state inside the piston assembly 44, the upper and lower pistons can move relative to each other in a substantially unimpeded manner. Cyclic lateral movement of the shaft 52 can be utilized by an auxiliary power take-off device, such as the rotary crank assembly 70 shown in FIG. 5.

The size of the lower piston assembly 44 can be altered according to particular applications. For instance, because the upper surface of the upper piston 46 of the lower piston assembly is exposed to the high pressure condition within the vessel, it may be desirable to reduce this surface area, or alter the shape of the exposed surface area, to limit a downward force being applied to the upper piston which may oppose upward movement of the upper piston assembly 45.

As shown at 60 in FIG. 1, an additional guide or support rail can be included in the system and can be coupled to the upper 45 and lower 44 piston assemblies or connecting rods 24 to provide additional support or guidance to the components of the system.

Figure 5:
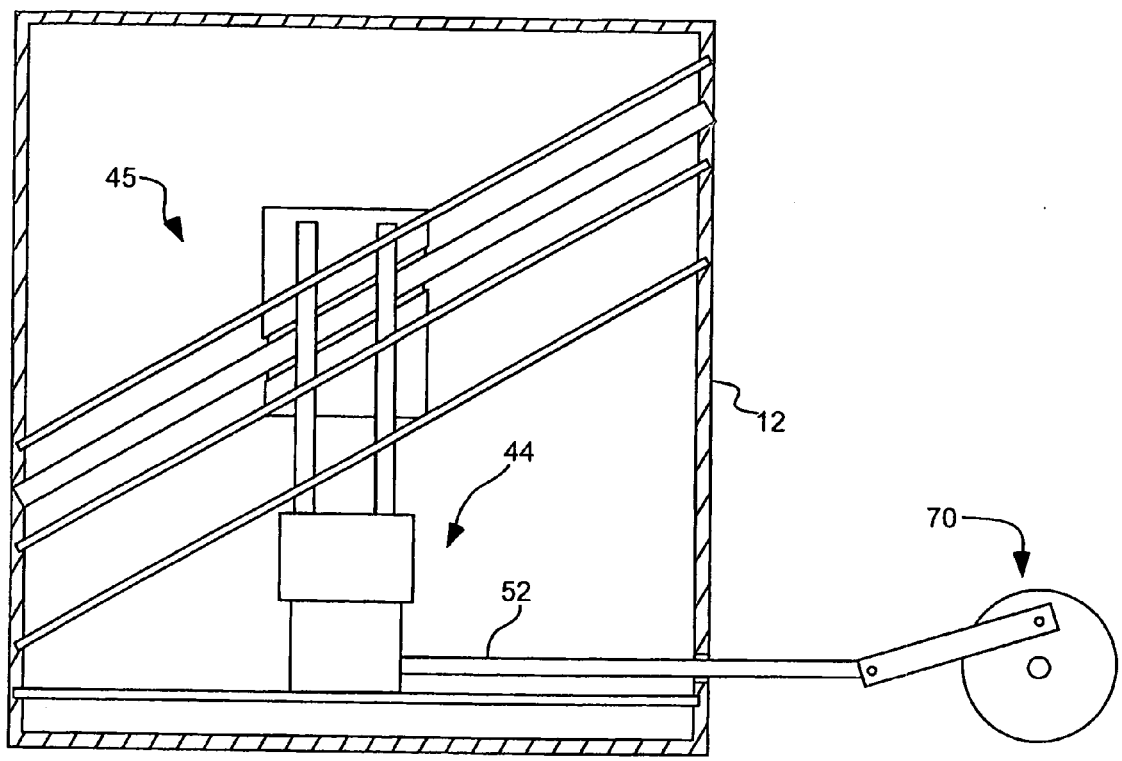
FIG. 5 is a front, partially sectional view of the engine of FIG. 1 including an auxiliary power take-off device.

As shown in FIG. 5, an auxiliary power take-off device can be operatively coupled to or associated with the pressure differential-driven engine. The power take-off device 70 shown in FIG. 5 includes a rotary crank coupled to the shaft 52 in a manner known to those skilled in the art. It is contemplated that any power take-off device can be associated with the present invention, and can be disposed within or external to the vessel 12. For example, it is contemplated that an electric generator can be associated with the engine to convert cyclic movement of the piston assemblies into electric power. By disposing the generator within the vessel 12, output of mechanical motion from the vessel can be limited, as it may be necessary only to output an electrical wire from the vessel to which electrically powered devices can be connected. This can be advantageous in that high-quality, dynamic seals may be necessary for mechanical devices moving in and out of openings in the pressure vessel, whereas simpler seals may suffice for devices which are not moving relative to the vessel, such as a power chord.

In addition to the collapsible piston assembly discussed above, it is contemplated that a number of power take-off devices can be associated with the pistons 17 and cylinders 18 to convert the cyclic movement of the piston/cylinder assemblies into usable mechanical energy. Examples can include belts or chains associated with the piston/cylinder assemblies to convert the cyclic motion into rotational motion of the chain or belt. Other examples can include ratchet and pawl assemblies, gear and sprocket assemblies, rotary motion converters, etc.

Figure 6:
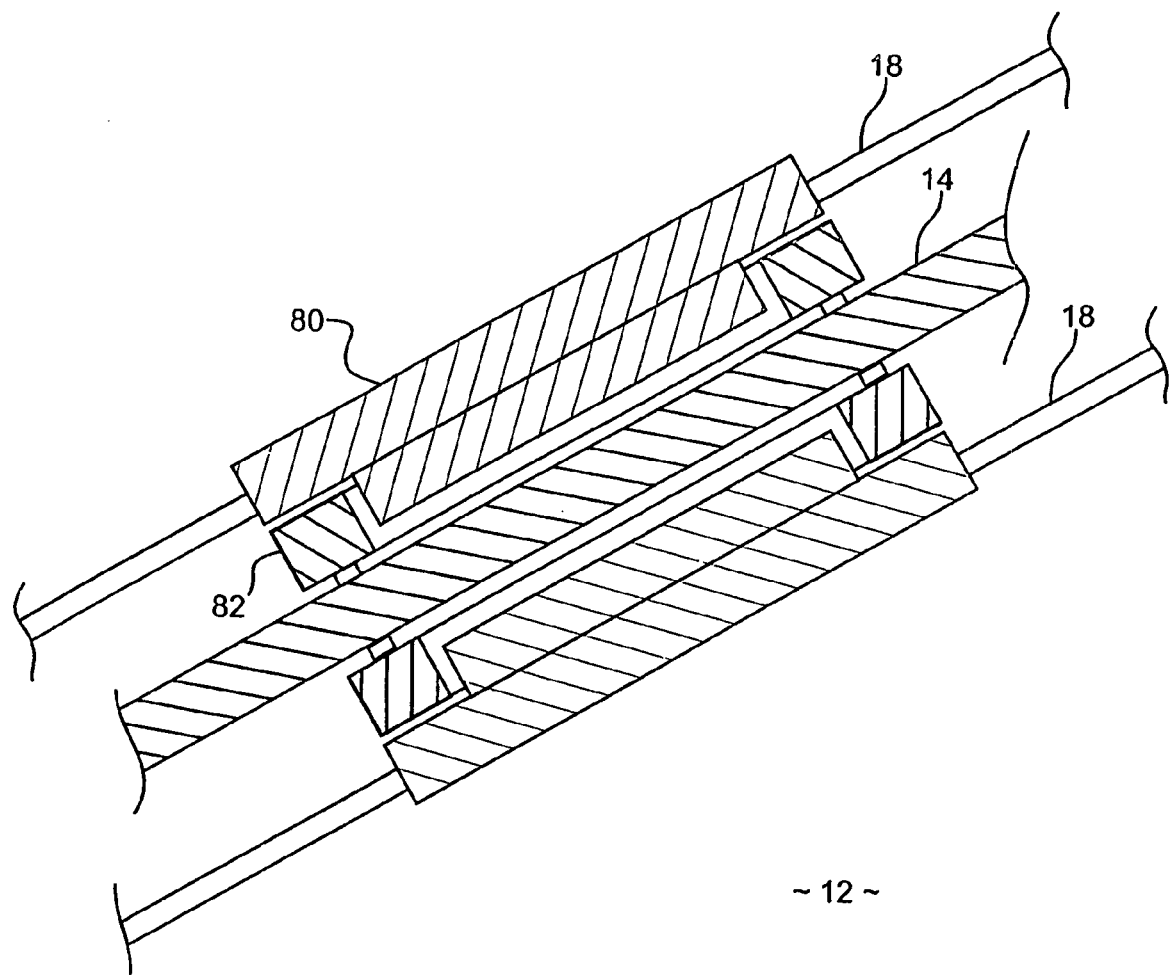
FIG. 6 is a front, sectional view of an actuator and actuator enclosure in accordance with another aspect of the invention.
Figure 7:
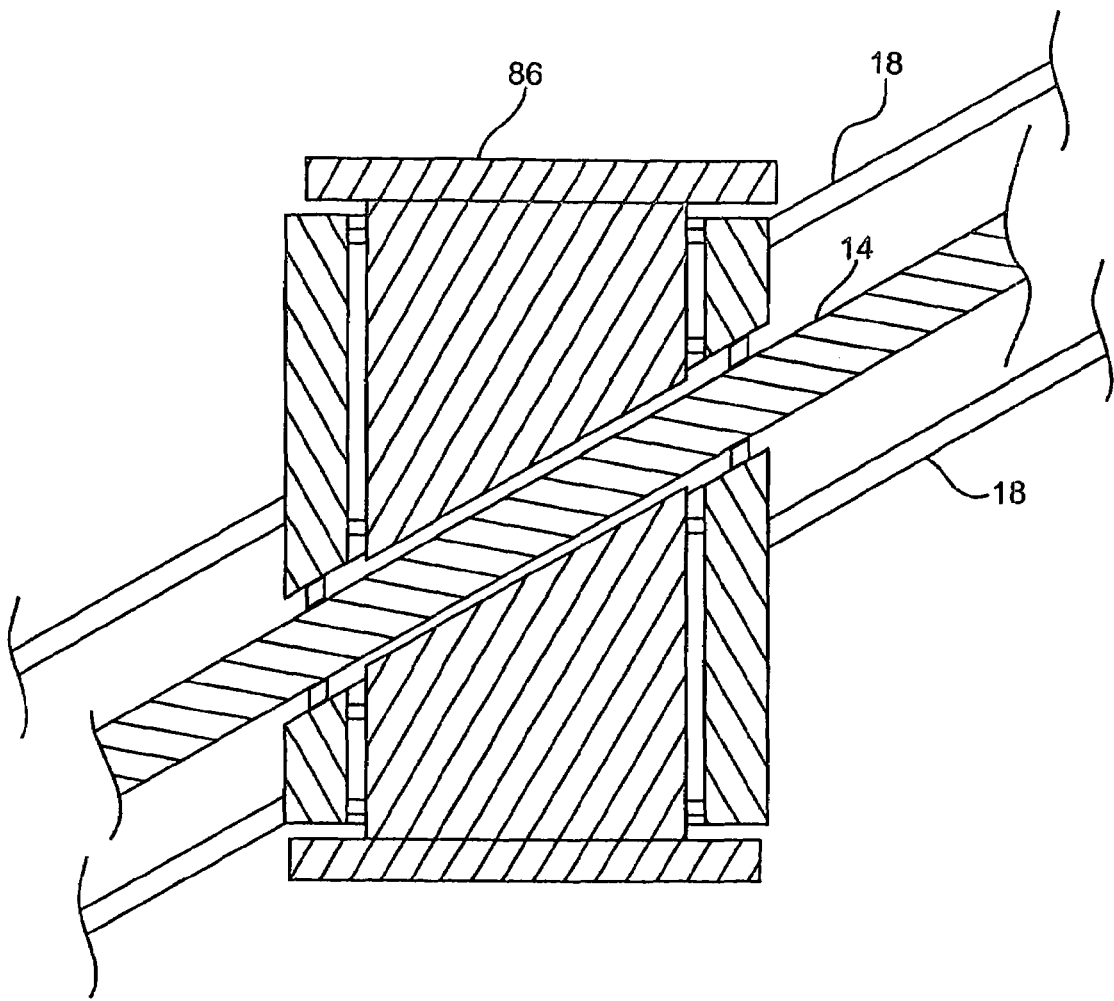
FIG. 7 is a front, sectional view of another actuator and actuator enclosure in accordance with another aspect of the invention.

FIGS. 6 and 7 illustrate piston and cylinder assemblies utilized in other aspects of the invention. In FIG. 6, the piston 80 is configured as a "cap" type device that can be fitted within a cylinder 82. As it is the area of the upper high pressure exposure surface of the piston 80 that is exposed to the high pressure condition when a pressure differential exists in the pressurizable cavity, increasing or maximizing the surface area of the piston can result in higher power being achieved with lower internal (high) pressure being required in the vessel. Similarly, as shown in FIG. 6, the top of the piston can be made parallel to the barrier plate and guide rails, or, as shown in FIG. 7, the tops of the pistons 86 can be made substantially parallel to true horizontal.

As the force or energy output by the engine is primarily a function of the high pressure condition within the vessel, the magnitude of the high pressure can be varied according to desired results. For example, if it is assumed that the surface area of a top of a piston is approximately 50 square inches, a high pressure with a magnitude of 200 psi will apply a force of approximately 10,000 pounds to the top of the piston. By varying either the surface area of the piston or the high pressure magnitude, the force applied to the piston when in the pressure differential condition can be varied. For example, by doubling or halving the high pressure magnitude, the force on the piston can correspondingly be doubled or halved. Thus, the desired output of the engine can be altered and tailored to specific applications.

The barrier plate 14 has been described as being substantially stationary relative to the vessel 12. As shown in FIG. 1, for example, the barrier plate can be coupled to the walls of the vessels to hold the plate stationary. In other embodiments, the barrier plate and guide rails can be disposed within a removable frame which can be coupled inside the vessel. In this manner, an engine can be provided that can be relatively easily dismantled, maintained, and repaired.

While the barrier plate and guide rails have been shown and described as being slanted from true vertical or horizontal, it is contemplated that they can be of any angle, including vertical or horizontal. In one embodiment the barrier plate and guide rails are formed at angle of about 22 degrees from horizontal. In another embodiment, the angle is 45 degrees. In another embodiment, the angle can range from about 8 degrees to about 45 degrees, depending on particular applications of the engine.

Figure 8:
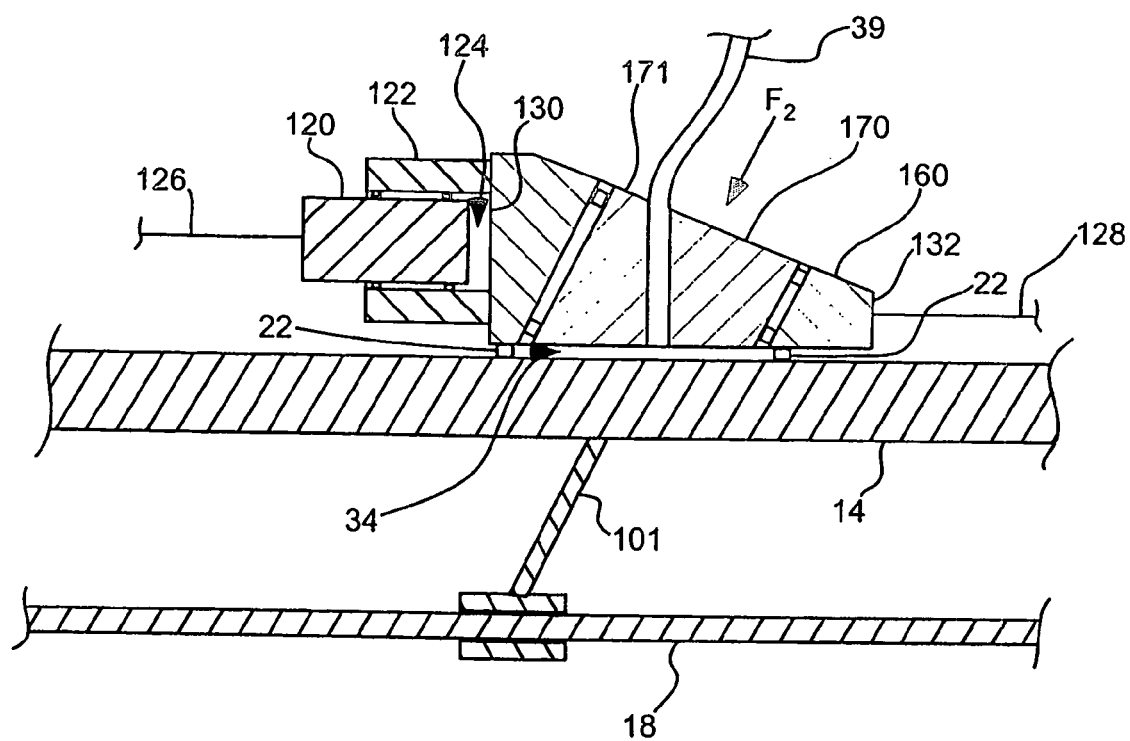
FIG. 8 is a front, sectional view of another actuator and actuator enclosure in accordance with another aspect of the invention.

Turning now to FIG. 8, an alternate piston and cylinder assembly is shown, wherein piston 170 is disposed within cylinder 160. In this embodiment, the barrier plate 14 and guide or support rail 18 are aligned substantially parallel to a bottom surface of the vessel 12 (not shown in FIG. 8), which corresponds to a substantially horizontal orientation with respect to FIG. 8. An upper, high pressure exposure surface 171 of the piston is aligned at an oblique angle with respect to the bottom surface of the vessel (i.e., the upper surface is aligned at an oblique angle with respect to horizontal). Thus, in this embodiment, it is the upper surface of the piston that provides an angled component of pressure-induced force to the assembly. An extension rail 101 extends downwardly from the piston and is slidably and rigidly coupled to guide or support rail 18. The extension rail shown can be coupled to the rear of the piston in a similar manner as that illustrated discussed in relation to FIG. 3.

As will be appreciated from FIG. 8, the force $F_2$ applied to the upper surface 171 of piston 170 includes both a vertical and a horizontal component. The vertical and horizontal components of this force are transferred to support rail 18, which results in horizontal movement of the piston and the cylinder to the left of the page. That is, the piston and cylinder have a direction of positive drive to the left of the page, as that is the direction in which the piston will travel when subjected to a low pressure state in pressurizable cavity 34. Hose 39 can provide venting and pressurizing of the cavity, as discussed in the embodiments above.

As cylinder 160 includes a generally larger frontal outer section 130 (to the left of the page of FIG. 8) than an outer rearward section 132 (the outer section to the right of the page of FIG. 8), the cylinder may be subject to a force differential which may tend to inhibit leftward travel of the cylinder and piston. To aid in overcoming this tendency, piston 120 can be disposed in cylinder 122 which can be coupled to or disposed adjacent to the frontal face 132 of the cylinder 160. A substantially constant low pressure state can be maintained in cavity 124 to at least partially remove the larger force component on this face 130 of cylinder 160. Restraining member 126 can be utilized to prevent piston 120 from collapsing upon the low pressure state cavity 124.

Figure 9A:
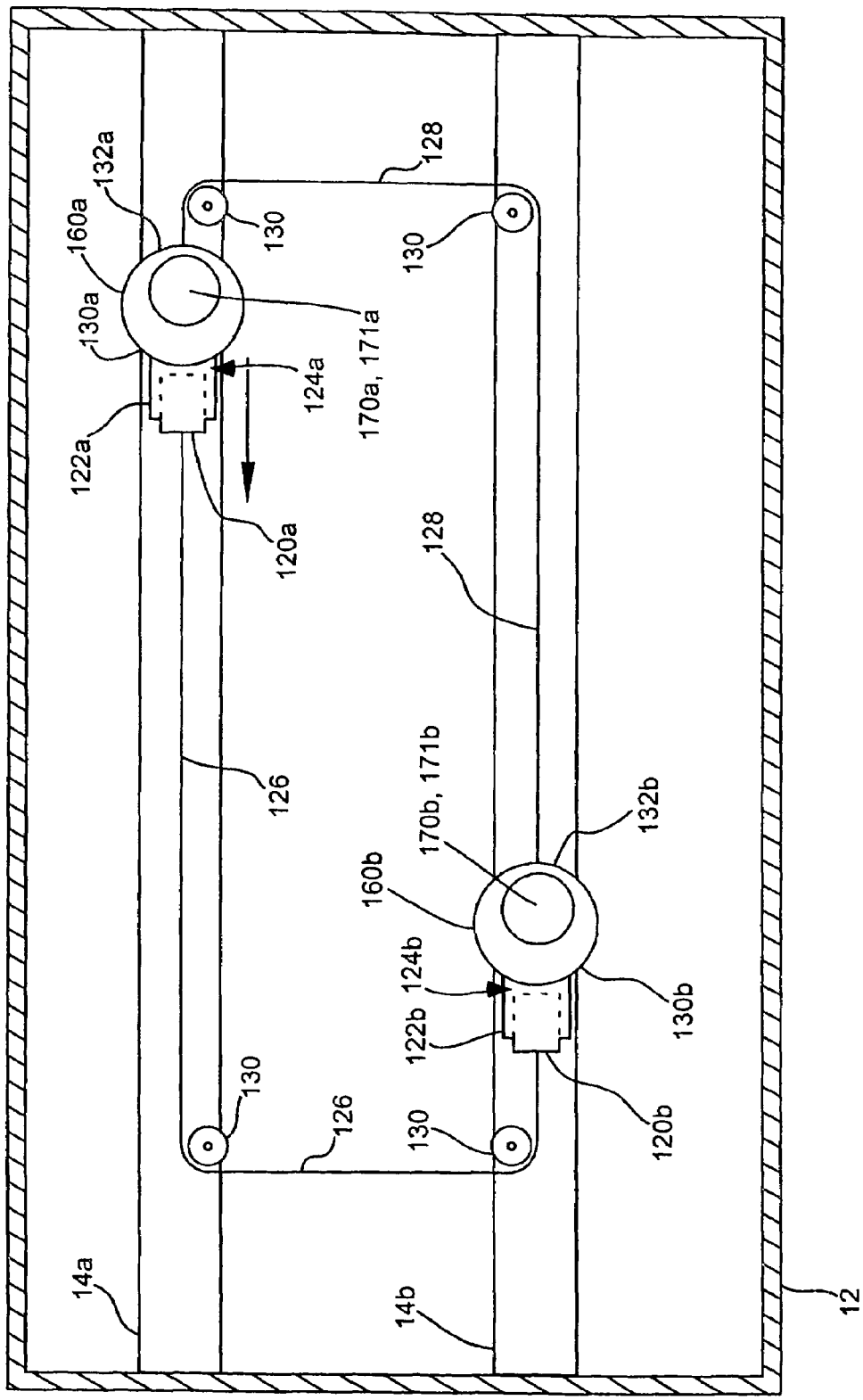
FIG. 9A is a top view of two of the actuators of FIG. 8 in a circuit configuration.

The use of restraining member 126 is shown in more detail in top view in FIG. 9A. In the embodiment of FIG. 9A, a first piston 170a and first cylinder 160a are disposed on barrier plate 14a. A second piston 170b and second cylinder 160b are disposed on barrier plate 14b. Each of the pistons have a direction of positive drive to the left of the page of FIG. 9A. Each of the pistons includes a frontal piston 120a, 120b which are coupled and held from relative movement of each cylinder 160a, 160b, respectively, by restraining member 126. As the frontal face of each piston 120a, 120b is constantly subjected to the higher pressure state within the vessel 12, the restraining member 126 is held in a substantially constant tension state about pulleys or guide wheels 130. Similarly, the rear face 132a, 132b of each cylinder is restrained by restraining member 128. Thus, when the piston and cylinders are in a neutral, stationary state, the restraining members restrain pistons 120a, 120b slightly apart from each cavity 124a, 124b, effectively restraining the pistons from collapsing on their respective cavities.

In one exemplary use, the pistons can originally be held in a neutral, i.e., immobile state. Upon creating a low pressure state in the pressurizable cavity of first piston 170a and cylinder 160a, the first piston will move to the left of the page of FIG. 9A. After reaching full travel to the left, the pressurizable cavity of the fist piston can be neutralized (i.e., pressurized to equal the high pressure state of the vessel), causing the first piston to stop moving. At that point, the lower piston 170b and cylinder 160b, which will have moved in neutral state to the position shown in FIG. 9B, can be energized to drive it to the left of the page of FIG. 9B. This cycle can then be repeated to create cyclical motion of the piston assemblies over the barrier plates.

Figure 9B:
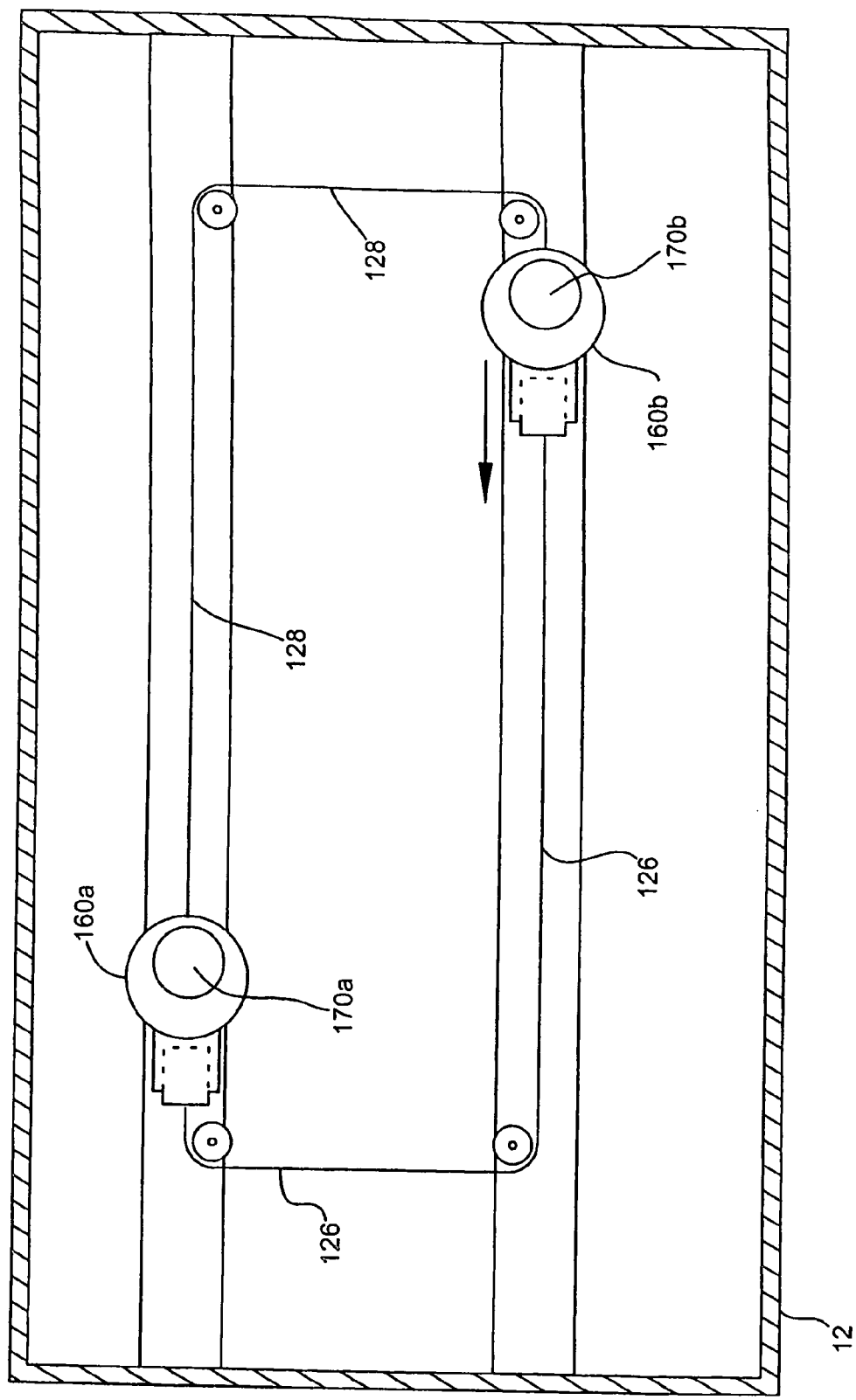
FIG. 9B is a top view of the actuators of FIG. 8 shown in post-actuation position.
Figure 10:
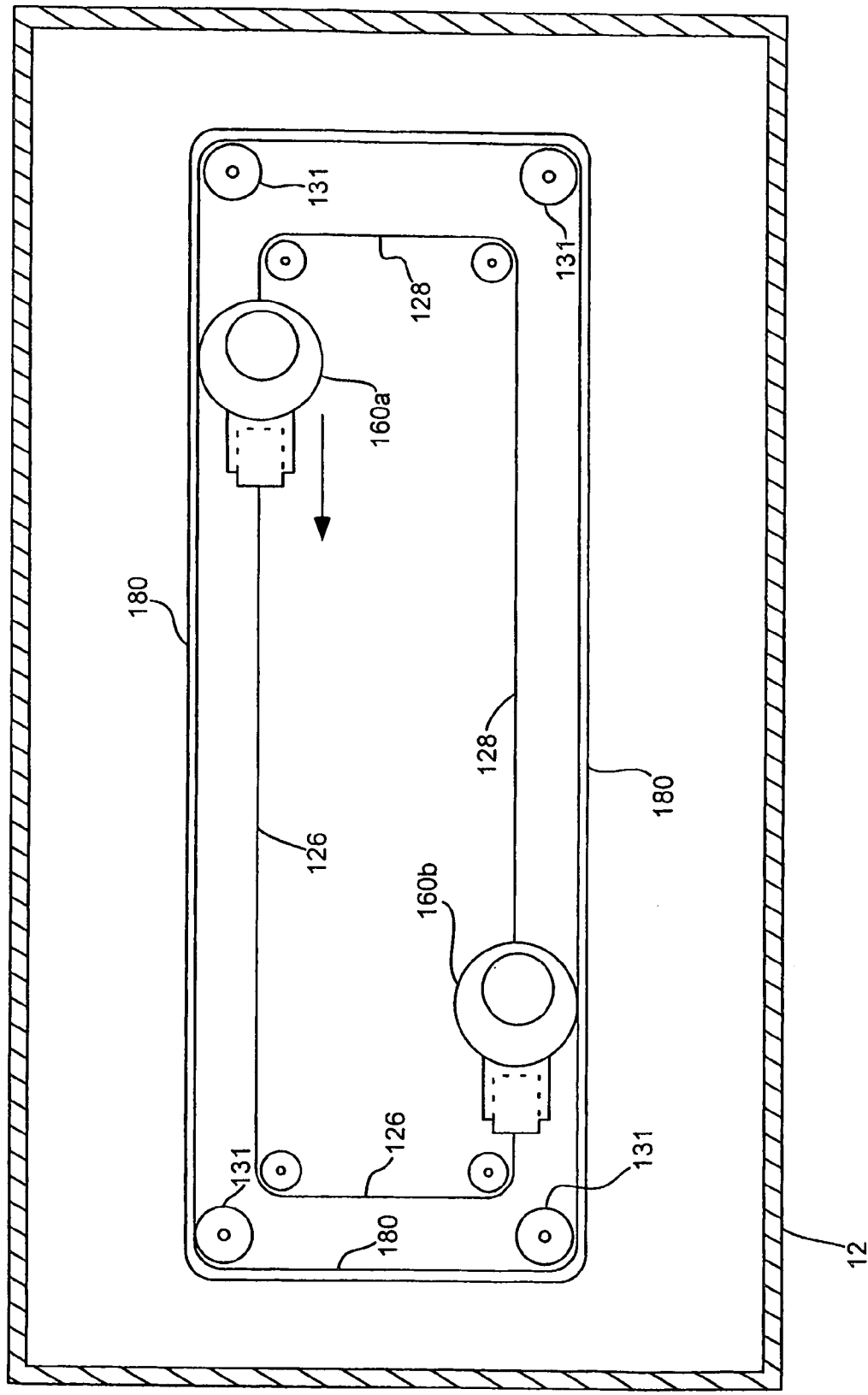
FIG. 10 is an alternate embodiment of the actuators of FIG. 8.

An alternate embodiment of the piston arrangement of FIGS. 9A and 9B is shown in FIG. 10 (note that barrier plates and guide or support rails are omitted from this view). In this aspect of the invention, a master restraining member 180 can be disposed about pulleys or guide wheels 131. The master restraining member can include a chain or generally slack-resistant conveyor structure to which each cylinder 160a, 160b can be substantially rigidly connected. The master restraining member can stabilize the travel path of the cylinders and can also be used as a power take-off device. For example, the master restraining member can be coupled to sprockets or other known devices to convert the cyclic, back-and-forth motion of the cylinders and pistons into useable mechanical energy.

The various components described herein can be formed of a variety of materials. However, in one embodiment, the barrier plate is formed of high-strength steel and provided with a highly polished surface to facilitate easy sliding of the cylinders over the surfaces of the barrier plate. Similarly, any of the surfaces described herein can include a highly polished finish to facilitate low friction movement of other components. Also, where relative motion between two components is illustrated, it is contemplated that bearing structures as known in the art can be incorporated to improve efficiency of the engine by reducing losses due to friction.

In accordance with another aspect of the invention, a method for converting energy from a high pressure fluid into usable translational energy is provided. The method can include the steps of: disposing an actuator enclosure adjacent a pressure barrier plate within an outer, high pressure enclosure, said actuator enclosure being slidable relative to the barrier plate within the outer, high pressure enclosure; disposing an actuator within the actuator enclosure, with a high pressure exposure surface of the actuator disposed at an oblique angle to the pressure barrier plate; retaining the actuator from moving with respect to the actuator enclosure; pressurizing the outer, high pressure enclosure to a high pressure state; and creating a low pressure state between the actuator and the actuator enclosure to thereby cause the actuator and actuator enclosure to slide relative to the barrier plate within the outer, high pressure enclosure.

The method can include the further step of rigidly and slidably coupling the actuator to a support rail fixed in a substantially constant position with respect to the barrier plate to translate force applied by the actuator into translational energy. The method can include the further step of aligning the support rail substantially parallel to the pressure barrier plate. The method can include the further steps of: aligning the pressure barrier plate at an oblique angle with respect to a lower surface of the outer enclosure, and orienting the high pressure exposure surface of the actuator substantially parallel to the lower surface of the outer enclosure.

The method can include the further steps of: aligning the pressure barrier plate substantially parallel to a lower surface of the outer enclosure, and orienting the high pressure exposure surface of the actuator at an oblique angle with respect to the lower surface of the outer enclosure.

The method can include the further step of disposing a second actuator enclosure adjacent the pressure barrier plate, the second actuator enclosure having a second actuator disposed therein, the second actuator enclosure and second actuator having a direction of positive drive opposing a direction of positive drive of the actuator enclosure and actuator.

The method can include the further step of operatively coupling a power take-off device to the actuator to convert cyclic linear motion of the actuator into useable mechanical energy.

The method can include the further step of disposing at least one substantially pressure-tight seal between the actuator enclosure and the barrier plate to facilitate slidable movement of the actuator enclosure along the barrier plate while maintaining the pressurizable cavity.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A pressure differential-driven engine, comprising:
an outer pressurizable enclosure;
a pressure barrier plate disposed within the outer pressurizable enclosure;
an actuator enclosure, disposed adjacent the pressure barrier plate and having an actuator disposed therein;
the actuator having a high pressure exposure surface forming an oblique angle with respect to the pressure barrier plate;
the pressure barrier plate, a bottom of the actuator, and the actuator enclosure cooperatively defining a pressurizable cavity cyclable between a first, high pressure state, and a second, low pressure state; and
the actuator and actuator enclosure being collectively slidable relative to the barrier plate, and the engine being configured so as to operate in reaction to cycling of the pressurizable cavity between the first and second pressure states to produce usable translational energy.

2. The engine of claim 1, further comprising at least one support rail fixed in position relative to the pressure barrier plate, and wherein the actuator is rigidly and slidably coupled to the support rail in a substantially constant position with respect to the actuator enclosure, the support rail being configured to translate force applied by the actuator into translational energy.

3. The engine of claim 2, wherein the at least one support rail is fixed in position substantially parallel to the pressure barrier plate.

4. The engine of claim 1, wherein the pressure barrier plate is aligned at an oblique angle with respect to a lower surface of the outer enclosure, and wherein the high pressure exposure surface of the actuator is oriented substantially parallel to the lower surface of the outer enclosure.

5. The engine of claim 1, wherein the pressure barrier plate is aligned substantially parallel to a lower surface of the outer enclosure, and wherein the high pressure exposure surface of the actuator is oriented at an oblique angle with respect to the lower surface of the outer enclosure.

6. The engine of claim 1, further comprising a second actuator enclosure disposed adjacent the pressure barrier plate having a second actuator disposed therein, the second actuator enclosure and second actuator having a direction of positive drive opposing a direction of positive drive of the actuator enclosure and actuator.

7. The engine of claim 1, further comprising a power take-off device operatively coupled to the actuator to convert cyclic linear motion of the actuator into useable mechanical energy.

8. The engine of claim 7, wherein the power take-off device includes a lower, collapsible piston assembly configured to convert the cyclic motion of the actuator and actuator assembly into lateral, linear cyclic motion.

9. The engine of claim 1, further comprising at least one substantially pressure-tight seal disposed between the actuator enclosure and the barrier plate to facilitate slidable movement of the actuator enclosure along the barrier plate while maintaining integrity of the pressurizable cavity.

10. The engine of claim 1, further comprising a valve system operatively coupled to the actuator, the valve system enabling cycling of the pressurizable cavity between the first and second pressure states.

11. The engine of claim 10, wherein the valve system selectively exposes the pressurizable cavity to an ambient pressure state external to the outer enclosure, said ambient pressure state corresponding to the second, low pressure state.

12. A pressure differential-driven engine, comprising:
an outer pressurizable enclosure;
a pressure barrier plate being disposed within the outer pressurizable enclosure;
an actuator enclosure, disposed upon the pressure barrier plate and having an actuator disposed therein, said actuator being rigidly and slidably coupled to at least one support rail fixed in position with respect to the actuator enclosure;
the pressure barrier plate, a bottom of the actuator, and the actuator enclosure cooperatively defining a pressurizable cavity cyclable between a first, high pressure state, and a second, low pressure state; and
the actuator and actuator enclosure being slidable relative to the barrier plate in reaction to cycling of the pressurizable cavity between the first and second pressure states to produce usable translational energy.

13. The engine of claim 12, wherein the at least one support rail is fixed in position substantially parallel to the pressure barrier plate.

14. The engine of claim 12, wherein the pressure barrier plate is oriented at an oblique angle with respect to a lower surface of the outer enclosure, and wherein a high pressure exposure surface of the actuator is oriented substantially parallel to the lower surface of the outer enclosure.

15. The engine of claim 12, wherein the pressure barrier plate is oriented substantially parallel to a lower surface of the outer enclosure, and wherein a high pressure exposure surface of the actuator is oriented at an oblique angle with respect to the lower surface of the outer enclosure.

16. The engine of claim 12, further comprising a second actuator enclosure disposed adjacent the barrier plate and having a second actuator disposed therein, the second actuator enclosure and second actuator having a direction of positive drive opposing a direction of positive drive of the actuator enclosure and actuator.

17. The engine of claim 12, further comprising a power take-off device operatively coupled to the actuator to convert cyclic linear motion of the actuator into useable mechanical energy.

18. The engine of claim 17, wherein the power take-off device includes a lower, collapsible piston assembly configured to convert the cyclic motion of the actuator and actuator assembly into lateral, linear cyclic motion.

19. The engine of claim 12, further comprising at least one substantially pressure-tight seal disposed between the actuator enclosure and the barrier plate to facilitate slidable movement of the actuator enclosure along the barrier plate while maintaining integrity of the pressurizable cavity.

20. The engine of claim 12, further comprising a valve system operatively coupled to the actuator, the valve system enabling cycling of the pressurizable cavity between the first and second pressure states.

21. The engine of claim 20, wherein the valve system selectively exposes the pressurizable cavity to an ambient pressure state external to the outer enclosure, said ambient pressure state corresponding to the second, low pressure state.

22. A method for converting energy from a high pressure fluid into usable translational energy, comprising the steps of:
disposing an actuator enclosure adjacent a pressure barrier plate within an outer, high pressure enclosure, said actuator enclosure being slidable relative to the barrier plate within the outer, high pressure enclosure;

disposing an actuator within the actuator enclosure, with a high pressure exposure surface of the actuator disposed at an oblique angle to the pressure barrier plate;

retaining the actuator from moving with respect to the actuator enclosure;

pressurizing the outer, high pressure enclosure to a high pressure state; and creating a low pressure state between the actuator and the actuator enclosure to thereby cause the actuator and actuator enclosure to slide relative to the barrier plate within the outer, high pressure enclosure.

23. The method of claim 22, comprising the further step of rigidly and slidably coupling the actuator to a support rail fixed in a substantially constant position with respect to the barrier plate to translate force applied by the actuator into translational energy.

24. The method of claim 23, comprising the further step of aligning the support rail substantially parallel to the pressure barrier plate.

25. The method of claim 22, comprising the further steps of:

aligning the pressure barrier plate at an oblique angle with respect to a lower surface of the outer enclosure, and orienting the high pressure exposure surface of the actuator substantially parallel to the lower surface of the outer enclosure.

26. The method of claim 22, comprising the further steps of:

aligning the pressure barrier plate substantially parallel to a lower surface of the outer enclosure, and orienting the high pressure exposure surface of the actuator at an oblique angle with respect to the lower surface of the outer enclosure.

27. The method of claim 22, comprising the further step of disposing a second actuator enclosure adjacent the pressure barrier plate, the second actuator enclosure having a second actuator disposed therein, the second actuator enclosure and second actuator having a direction of positive drive opposing a direction of positive drive of the actuator enclosure and actuator.

28. The method of claim 22, comprising the further step of operatively coupling a power take-off device to the actuator to convert cyclic linear motion of the actuator into useable mechanical energy.

29. The method of claim 28, wherein the power take-off device includes a lower, collapsible piston assembly configured to convert the cyclic motion of the actuator and actuator assembly into lateral, linear cyclic motion.

30. The method of claim 22, comprising the further step of disposing at least one substantially pressure-tight seal between the actuator enclosure and the barrier plate to facilitate slidable movement of the actuator enclosure along the barrier plate while maintaining integrity of the pressurizable cavity.

31. The method of claim 22, comprising the further step of operatively coupling a valve system to the actuator, the valve system enabling cycling of the pressurizable cavity between the first and second pressure states.

32. The method of claim 31, wherein the valve system selectively exposes the pressurizable cavity to an ambient pressure state external to the outer enclosure, said ambient pressure state corresponding to the low pressure state.

* * * * *